(12) United States Patent
Ma et al.

(10) Patent No.: US 12,511,291 B2
(45) Date of Patent: Dec. 30, 2025

(54) METHOD, APPARATUS, DATA PROCESSING DEVICE, AND MEDIUM FOR CONTROLLING FREQUENCY SEARCH SPEED

(71) Applicant: SHENZHEN MICROBT ELECTRONICS TECHNOLOGY CO., LTD., Guangdong (CN)

(72) Inventors: Weibin Ma, Guangdong (CN); Lihong Huang, Guangdong (CN); Yuefeng Wu, Guangdong (CN); Haifeng Guo, Guangdong (CN); Zuoxing Yang, Guangdong (CN)

(73) Assignee: SHENZHEN MICROBT ELECTRONICS TECHNOLOGY CO., LTD., Guangdong (CN)

( * ) Notice: Subject to any disclaimer, the term of this patent is extended or adjusted under 35 U.S.C. 154(b) by 71 days.

(21) Appl. No.: 18/281,373

(22) PCT Filed: Mar. 7, 2023

(86) PCT No.: PCT/CN2023/079952
§ 371 (c)(1),
(2) Date: Sep. 11, 2023

(87) PCT Pub. No.: WO2024/082519
PCT Pub. Date: Apr. 25, 2024

(65) Prior Publication Data
US 2025/0086182 A1 Mar. 13, 2025

(30) Foreign Application Priority Data
Oct. 20, 2022 (CN) .......... 202211288164.X (51) Int. Cl.
*G06F 16/2455* (2019.01)

(52) U.S. Cl.
CPC ............... *G06F 16/2455* (2019.01)

(58) Field of Classification Search
CPC ....... G06F 16/248; G06F 16/245; G06F 9/451
See application file for complete search history.

(56) References Cited

U.S. PATENT DOCUMENTS 10,970,298 B1 * 4/2021 Madheswaran ......... H04L 41/22
11,493,981 B1 11/2022 Ma et al.
(Continued)

FOREIGN PATENT DOCUMENTS

CN 107920384 A 4/2018
CN 111966409 A 11/2020
(Continued)

OTHER PUBLICATIONS

International Search Report and Written Opinion for PCT/CN2023/079952 dated Jun. 23, 2023 (8 pages).
(Continued)

*Primary Examiner* — William P Bartlett
(74) *Attorney, Agent, or Firm* — Merchant & Gould P.C.

(57) ABSTRACT

This disclosure relates to a method, an apparatus, and a data processing device for controlling a frequency search speed, the method for controlling the frequency search speed including: obtaining parameter information of a frequency search speed regulation gear; obtaining a frequency search parameter based on the parameter information of the frequency search speed regulation gear; and performing frequency search based on the obtained frequency search parameter.

9 Claims, 3 Drawing Sheets

(56) References Cited

U.S. PATENT DOCUMENTS

| | | | |
|---|---|---|---|
| 2009/0083263 A1* | 3/2009 | Felch .................. | G11C 7/1039 |
| | | | 707/999.005 |
| 2015/0234890 A1* | 8/2015 | Legrand ................ | G06F 16/245 |
| | | | 707/769 |
| 2021/0208663 A1 | 7/2021 | Cooper et al. | |
| 2022/0374063 A1 | 11/2022 | Ma et al. | |

FOREIGN PATENT DOCUMENTS

| | | |
|---|---|---|
| CN | 112015260 A | 12/2020 |
| CN | 114779879 A | 7/2022 |
| CN | 115374164 A | 11/2022 |
| EP | 2759907 A1 | 7/2014 |

OTHER PUBLICATIONS

First Chinese Office Action dated Dec. 2, 2022 for Application No. 202211288164.X (21 pages including English Translation).
Second Chinese Office Action dated Jan. 10, 2023 for Application No. 202211288164.X (12 pages including English Translation).
Notification to Grant Patent Right for Invention dated Mar. 26, 2023 for Chinese Application No. 202211288164.X (4 pages including English Translation).
Shiyou Qian, et. al., "Adjusting Matching Algorithm to Adapt to Workload Fluctuations in Content-based Publish/Subscribe Systes", IEEE Conference on Computer Communications, 2019, pp. 1936-1944.

* cited by examiner

METHOD, APPARATUS, DATA PROCESSING DEVICE, AND MEDIUM FOR CONTROLLING FREQUENCY SEARCH SPEED

CROSS-REFERENCE TO RELATED APPLICATIONS

This present application is a National Stage Entry of International application No. PCT/CN2023/079952 filed on Mar. 7, 2023, which claims the priority to Chinese Patent Application No. 202211288164.X filed on Oct. 20, 2022 and entitled "METHOD, APPARATUS, AND DATA PROCESSING DEVICE FOR FREQUENCY SEARCH SPEED REGULATION", which is incorporated herein by reference in its entirety.

TECHNICAL FIELD

This application relates to the field of computer technologies, and in particular, to a method, an apparatus, and a data processing device for controlling a frequency search speed.

BACKGROUND

With the development of computer technologies, the computing power of data processing devices such as a computer has been greatly improved. In a case that scientific computing needs to be supported by the huge computing efficiency, in order to achieve the computing efficiency as high as possible and a stable operation for a long time, the data processing devices need to perform frequency search work.

SUMMARY

In view of this, the disclosure provides a frequency search speed regulation method, an apparatus and a data processing device to realize the control of the frequency search speed, and then indirectly control the computing efficiency in a process of the frequency search through the control of the frequency search speed, so as to meet the different computing efficiency requirements in the process of the frequency search.

The technical solutions of the disclosure are implemented as follows:

An embodiment of this application provides a method for controlling a frequency search speed, performed by a data processing device, including:
  obtaining parameter information of a frequency search speed regulation gear;
  obtaining a frequency search parameter based on the parameter information of the frequency search speed regulation gear; and
  performing frequency search based on the obtained frequency search parameter.

In exemplary embodiments, the method further includes:
setting a frequency search initial parameter and an adjustment coefficient, wherein
the obtaining the frequency search parameter based on the parameter information of the frequency search speed regulation gear includes:
  obtaining the frequency search parameter based on the parameter information of the frequency search speed regulation gear, the frequency search initial parameter, and the adjustment coefficient.

In exemplary embodiments, the obtaining the frequency search parameter based on the parameter information of the frequency search speed regulation gear, the frequency search initial parameter, and the adjustment coefficient includes:
  multiplying the parameter information of the frequency search speed regulation gear with the adjustment coefficient, and adding a result obtained through multiplying to the frequency search initial parameter, to obtain the frequency search parameter.

In exemplary embodiments, the frequency search parameter includes at least one of a target accuracy parameter, a frequency search rise speed parameter, a frequency search range parameter, and times of frequency search retry.

In exemplary embodiments, the target accuracy parameter includes at least one of a target power consumption ratio range parameter, a target computing efficiency range parameter, a target power range parameter, and a target temperature range parameter.

In exemplary embodiments, the method further includes:
  determining a frequency search restrictive condition that needs to be disabled based on the parameter information of the frequency search speed regulation gear; and
  in a process of performing frequency search based on the obtained frequency search parameter, disabling the determined frequency search restrictive condition.

In exemplary embodiments, the method further includes:
establishing a mapping relationship between the parameter information of the frequency search speed regulation gear and the frequency search restrictive condition;
wherein the determining the frequency search restrictive condition that needs to be disabled based on the parameter information of the frequency search speed regulation gear includes:
obtaining the frequency search restrictive condition corresponding to the parameter information of the frequency search speed regulation gear based on the mapping relationship; and
determining the obtained frequency search restrictive condition as the frequency search restrictive condition that needs to be disabled.

In exemplary embodiments, the frequency search restrictive condition includes at least one of a restrictive condition of waiting for power stabilization, a restrictive condition of waiting for ambient temperature stabilization, a restrictive condition of waiting for power output stabilization, and a restrictive condition of a computing efficiency guarantee policy.

Further,
  an embodiment of this application provides an apparatus for controlling a frequency search speed, including:
  a parameter acquisition module, configured to obtain parameter information of a frequency search speed regulation gear;
  a frequency search parameter acquisition module, configured to obtain a frequency search parameter based on the parameter information of the frequency search speed regulation gear; and
  a frequency search module, configured to perform frequency search based on the obtained frequency search parameter.

In exemplary embodiments, the apparatus further includes: a parameter setting module, configured to set a frequency search initial parameter and an adjustment coefficient, wherein
  the frequency search parameter acquisition module is configured to obtain the frequency search parameter based on the parameter information of the frequency search speed regulation gear, the frequency search initial parameter, and the adjustment coefficient.

In exemplary embodiments, the frequency search parameter acquisition module is configured to multiply the parameter information of the frequency search speed regulation gear with the adjustment coefficient, and add a result obtained through multiplying to the frequency search initial parameter, to obtain the frequency search parameter.

In exemplary embodiments, the apparatus for controlling the frequency search speed further includes:
  a frequency search restrictive condition determining module, configured to determine a frequency search restrictive condition that needs to be disabled based on the parameter information of the frequency search speed regulation gear; and
  a frequency search restrictive condition disabling module, configured to, in a process of performing frequency search based on the obtained frequency search parameter, disable the frequency search restrictive condition.

Further.
  an embodiment of this application provides a data processing device, and the data processing device adopts the frequency search speed regulation apparatus according to any one of the foregoing items.

An embodiment of this application further provides an electronic device, including:
  a processor; and
  a memory, configured to store executable instructions of the processor, wherein
  the processor is configured to execute the executable instructions, to implement the method for controlling the frequency search speed according to any one of the foregoing items.

An embodiment of this application further provides a computer-readable storage medium, when at least one instruction in the computer-readable storage medium is executed by a processor of an electronic device, the electronic device is enable to implement the method for controlling the frequency search speed according to any one of the foregoing items.

An embodiment of this application further provides a computer program product, including a computer program, wherein when the computer program is executed by a processor, the method for controlling the frequency search speed according to any one of the foregoing items is implemented.

DETAILED DESCRIPTION

In order to make the objectives, technical solutions, and advantages of this disclosure clearer and more comprehensible, the followings further describe this disclosure in detail with reference to the accompanying drawings and embodiments.

It should be noted that in the specification, claims, and accompanying drawings of this disclosure, the terms "first", "second", and so on are intended to distinguish between similar objects but do not necessarily indicate a specific order or sequence. It should be understood that the data so used may be interchanged in an appropriate condition, so that the embodiments of the present disclosure described herein can be implemented in an order other than those illustrated or described herein. The following implementations described in the following exemplary embodiments do not represent all implementations that are consistent with this disclosure. Instead, they are merely examples of apparatuses and methods consistent with aspects related to this disclosure as recited in the appended claims.

When a data processing device such as a computer performs massive data operations, the data processing capacity is related to the configuration, the environment, the power supply state thereof. In order to ensure that the data processing device can work in the most ideal state, after the data processing device is started, a frequency search operation is required to determine an ideal operating frequency of each chip in the data processing device. In this way, it can ensure that the data processing device works at an ideal frequency, so that the data processing device can achieve stable operation, maximize data computing efficiency, and save unnecessary power consumption.

However, the frequency search process may take a long time, and the frequency search process may occupy data computing resources and thus reduce data computing efficiency. Therefore, different data processing requirements also have different requirements for frequency search time. For example, for tens of minutes of frequency search time, compared with a data operation that only takes tens of minutes or less, the system resources occupied by the frequency search may extend the data operation time, thereby reducing the computing efficiency; and for the data operation whose data operation time is much greater than the frequency search time, the frequency search process may shorten the data operation time, and the frequency search time is the time consumed by the frequency search process.

From the perspective of data operation, generally, as the data operation time is from short to long, the frequency search process is more and more effective in improving the computing efficiency.

However, as mentioned above, because the frequency search process is not a short process, and the frequency search process may affect the computing efficiency of the data processing device, the data processing tasks of different operation times also have different requirements for the frequency search time. This requires the frequency search speed to be controlled, so that the frequency search time can be shortened by improving the frequency search speed, or the frequency search time can be extended by reducing the frequency search speed, so as to meet the requirements for data processing tasks of different operation times.

In view of this, embodiments of this disclosure provide a method, an apparatus and a data processing device for controlling the frequency search speed. By obtaining parameter information of different frequency search speed regulation gears, adjusting frequency search parameter of the frequency search process, and performing the frequency search process by using different frequency search parameters, it is realized the control of the frequency search speed, and indirectly controlling the computing efficiency during the frequency search process, thereby satisfying the requirements for computing efficiency of different data processing tasks during the frequency search process.

Figure 1:
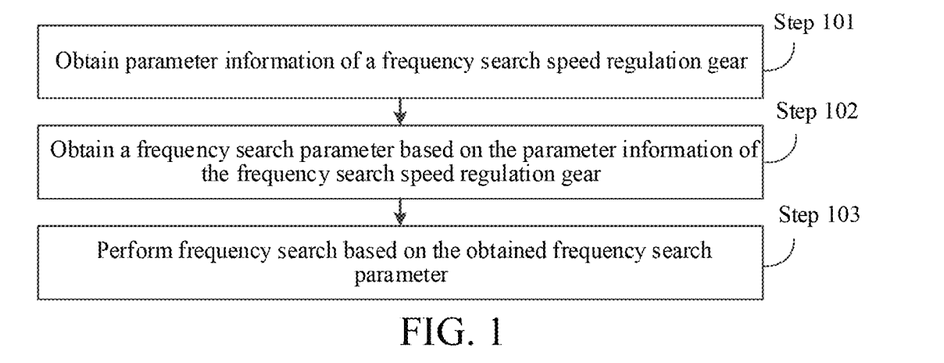
FIG. 1 is a flowchart of a method for controlling a frequency search speed according to an embodiment of this application.

FIG. 1 is a flowchart of a method for controlling a frequency search speed according to an embodiment of this application. As shown in FIG. 1, the method for controlling the frequency search speed is executed by a data processing device, and mainly includes the following steps 101 to 103.

Step 101: Obtain parameter information of frequency search speed regulation gear.

In some embodiments, parameter information of a plurality of frequency search speed regulation gears may be set based on demand. In some embodiments, the parameter information of the frequency search speed regulation gear may be gear information in a digital form, such as 0, 1, 2, 3, 4, and the like, and several or more may be set based on demand. For example, the parameter information of the frequency search speed regulation gear of 10 gears may be set, which are 0, 1, 2, 3, 4, 5, 6, 7, 8, 9 respectively. Different gear information indicates different degrees of adjustment of the frequency search speed, that is, the parameter information of the frequency search speed regulation gear indicates the degree of adjustment of the frequency search speed.

Step 102: Obtain a frequency search parameter based on the parameter information of the frequency search speed regulation gear.

Wherein, the frequency search parameter refers to a parameter corresponding to any factor that determines the frequency search speed during the frequency search process. For example, a frequency search rise speed is one of the factors that determine the frequency search speed, and corresponds to the factor of the frequency search rise speed. The frequency search parameter is a parameter corresponding to the frequency search rise speed during the frequency search process. The frequency search parameter of the factor of the frequency search rise speed can be referred to as a frequency search rise speed parameter.

In the data processing device, there are many factors that can determine the frequency search speed. In this embodiment of this disclosure, a mapping relationship is established between these factors and the parameter information of the frequency search speed regulation gear, so that based on the mapping relationship, the parameter information corresponding to different frequency search speed regulation gears can obtain the expected corresponding factors with different setting conditions; and based on the factors with different setting conditions, different frequency search speeds can be obtained, so as to achieve the control and adjustment of the frequency search speed. Based on this, the method for controlling the frequency search speed in this embodiment of this disclosure further includes: setting a frequency search initial parameter and an adjustment coefficient.

On this basis, Step 102 includes:
obtaining the frequency search parameter based on the parameter information of the frequency search speed regulation gear, the frequency search initial parameter, and the adjustment coefficient.

Wherein, the frequency search initial parameter refers to an initial parameter corresponding to any factor that determines the frequency search speed during the frequency search process. For example, corresponding to the factor of the frequency search rise speed, the frequency search initial parameter is an initial parameter corresponding to the frequency search rise speed during the frequency search process. The frequency search initial parameter of the factor of the frequency search rise speed can be referred to as a frequency search rise speed initial parameter.

The adjustment coefficient refers to a conversion coefficient that is preset in order to obtain the frequency search parameter based on the parameter information of the frequency search speed regulation gear and the frequency search initial parameter, for any factor that determines the frequency search speed.

For example, for the factor of the frequency search rise speed, the frequency search rise speed parameter is obtained from the parameter information of the frequency search speed regulation gear and the frequency search rise speed initial parameter, wherein the parameter information of the frequency search speed regulation gear and the frequency search rise speed initial parameter are converted by using the adjustment coefficient of the frequency search rise speed to obtain the frequency search rise speed parameter, and the adjustment coefficient of the frequency search rise speed can be referred to as a frequency search rise speed coefficient.

In some embodiments, the obtaining the frequency search parameter based on the parameter information of the frequency search speed regulation gear, the frequency search initial parameter, and the adjustment coefficient further includes:

multiplying the parameter information of the frequency search speed regulation gear with the adjustment coefficient, and adding a result obtained through multiplying to the frequency search initial parameter, to obtain the frequency search parameter.

Wherein, the formula for obtaining the frequency search parameter is as follows:

$$B = B0 + A \cdot C$$

Alternatively, the formula for obtaining the frequency search parameter is as follows:

$$B = B0 - A \cdot C$$

Wherein, A is the parameter information of the frequency search speed regulation gear, C is the adjustment coefficient, B0 is the frequency search initial parameter, and B is the frequency search parameter.

For example, if the frequency search speed regulation gear is gear 0, and the parameter information A of the frequency search speed regulation gear, for example, is 0, B=B0 is obtained by the foregoing formula, that is, under the frequency search speed regulation gear of gear 0, the frequency search parameter is the frequency search initial parameter. It can be seen that the method for controlling the frequency search speed in this embodiment of this disclosure is equivalent to directly adopting the frequency search initial parameter in the case of the frequency search speed regulation gear of gear 0. In some embodiments, the frequency search parameter used in the method for controlling the frequency search speed in the relevant technology can be directly set as the frequency search initial parameter as described above, so that the method for controlling the frequency search speed in this embodiment of this disclosure can be directly compatible with the frequency search method in the relevant technology. When the frequency search is performed by using the method in this embodiment of this disclosure, the various frequency search parameters in the frequency search method in the relevant technology can be set based on the parameter information of the frequency search speed regulation gear.

The above about that the parameter information A of the frequency search speed regulation gears is 0 when the frequency search speed regulation gears is gear 0 is only a schematic example. In some embodiments, the names of the gears are such as gear 0, gear 1, gear 2, and the like, wherein the parameter information of the frequency search speed regulation gear of gear 0 may be a value that is not 0, and whether the frequency search speed regulation gear is gear 0, gear 1, gear 2, or more gears, the parameter information A of the corresponding frequency search speed regulation gear may be set as a corresponding value based on the design requirements, and the corresponding value may be a value of the name of the gear, or may not be a value of the name of the gear. In other words, in some embodiments, gear 0, gear 1, gear 2, or more gears may only represent the names of the gears, but it does not mean that the specific value of the parameter information A of the frequency search speed regulation gear of a certain gear must be equal to the value in the name of this gear.

Wherein, the adjustment coefficient C may be set separately based on different frequency search parameters, and the value of the adjustment coefficient C may be a positive value or a negative value.

In some embodiments, the frequency search parameter includes at least one of a target accuracy parameter, a frequency search rise speed parameter, a frequency search range parameter, and times of frequency search retry. Wherein, the frequency search rise speed parameter refers to the speed of frequency rise during the frequency search process. The frequency search range parameter refers to the frequency range covered by the frequency search process, and the times of frequency search retry refers to the times of repeated attempts for frequency search.

Wherein, the target accuracy parameter may indicate the accuracy to be achieved by a final result of the frequency search. In some embodiments, the target accuracy parameter includes at least one of a target power consumption ratio range parameter, a target computing efficiency range parameter, a target power range parameter, and a target temperature range parameter. In some other embodiments, the frequency search parameter (not limited to the target accuracy parameter) may also include other specific parameters that may be involved in actual operation in such as the data processing device. Wherein, the target power consumption ratio range parameter refers to the regional range of the target power consumption finally to be achieved by the frequency search process, the target computing efficiency range parameter refers to the regional range of the target computing efficiency finally to be achieved by the frequency search process, the target power range parameter refers to the regional range of the target power finally to be achieved by the frequency search process, and the target temperature range parameter refers to the regional range of the target temperature finally to be achieved by the frequency search process.

For the foregoing various range parameters, the foregoing formulas may be used to calculate the range upper limit value and the range lower limit value for the range parameters. For example, for the frequency search range parameter, the upper limit of the frequency search range and the lower limit of the frequency search range may be included, and the foregoing formulas may be used to calculate an upper limit parameter for the frequency search range and a lower limit parameter for the frequency search range, respectively. The calculation for the upper limit parameter of the frequency search range may include: multiplying the parameter information of the frequency search speed regulation gear with the adjustment coefficient of the upper limit of the frequency search range, and adding a result obtained through multiplying to an initial parameter of the upper limit of the frequency search range, to obtain the upper limit parameter of the frequency search range. The calculation for the lower limit parameter of the frequency search range may include: multiplying the parameter information of the frequency search speed regulation gear with the adjustment coefficient of the lower limit of the frequency search range, and adding a result obtained through multiplying to an initial parameter of the lower limit of the frequency search range, to obtain the lower limit parameter of the frequency search range.

In addition to the foregoing embodiment in which it is to obtain the frequency search parameter by adding the result obtained by multiplying the parameter information of the frequency search speed regulation gear with the adjustment coefficient to the frequency search initial parameter, the method for controlling the frequency search speed in this embodiment of this disclosure can also obtain the frequency search parameter based on the parameter information of the frequency search speed regulation gear through establishing a mapping relationship between the parameter information of the frequency search speed regulation gear and the frequency search parameter in advance. Wherein, the mapping relationship between the parameter information of the frequency search speed regulation gear and the frequency search parameter may be implemented in the form of a relational mapping list.

In addition to the parameters related to the frequency search itself, there are some restrictive conditions on the frequency search process itself that may affect the frequency search speed during the frequency search process. What's more, other work performed simultaneously by the data processing device during the frequency search process may also limit the frequency search speed or limit the frequency search efficiency, and some of the work can be performed after the frequency search process. Therefore, in this embodiment of this disclosure, the restrictive condition of the frequency search process itself and the effect of other work performed simultaneously with the frequency search process on the frequency search speed are also considered, and the restrictive condition is adjusted and/or the execution of certain work is limited based on different gears.

Figure 2:
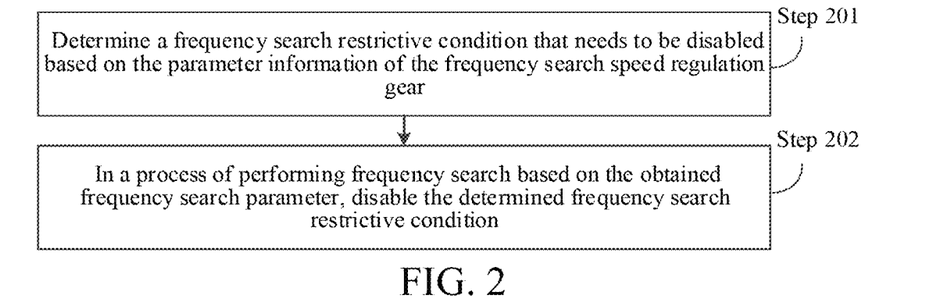
FIG. 2 is another flowchart of a method for controlling the frequency search speed according to an embodiment of this application.

FIG. 2 is another flowchart of a method for controlling the frequency search speed according to a specific embodiment. As shown in FIG. 2, the method for controlling the frequency search speed further includes the following steps 201 and 202.

Step 201: Determine a frequency search restrictive condition that needs to be disabled based on the parameter information of the frequency search speed regulation gear.

In some embodiments, the frequency search restrictive condition that needs to be disabled may be determined in advance based on the requirements for the data processing task. And then, it is set which frequency search restrictive condition(s) is/are to be disabled at which gear based on the parameter information of the different frequency search speed regulation gears. Based on this, the method for controlling the frequency search speed in this embodiment of this disclosure may further include:

establishing a mapping relationship between the parameter information of the frequency search speed regulation gear and the frequency search restrictive condition.

In some embodiments, the mapping relationship between the parameter information of the frequency search speed regulation gear and the frequency search restrictive condition may be implemented in the form of a relational mapping list.

Figure 3:
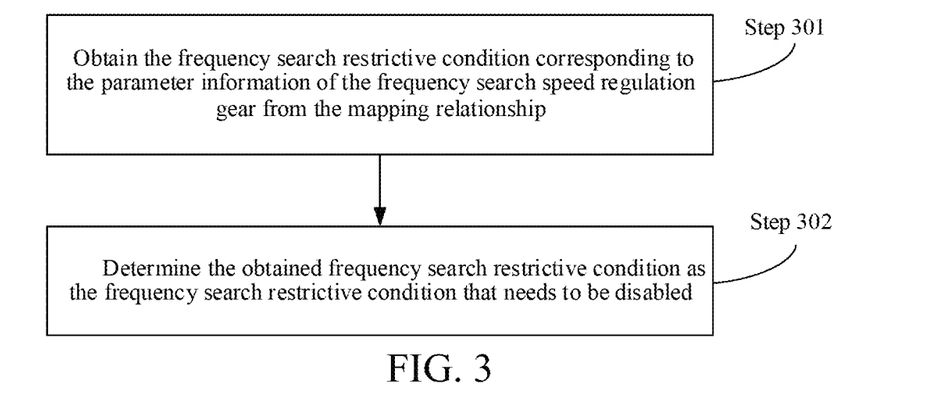
FIG. 3 is a flowchart of determining a frequency search restrictive condition that needs to be disabled according to an embodiment of this application.

On this basis, FIG. 3 shows a flowchart of determining the frequency search restrictive condition that needs to be disabled. In Step 201, the determining the frequency search restrictive condition that needs to be disabled based on the parameter information of the frequency search speed regulation gear may further include the following steps 301 to 302.

Step 301: Obtain the frequency search restrictive condition corresponding to the parameter information of the frequency search speed regulation gear based on the mapping relationship.

In some embodiments, the frequency search restrictive condition may be obtained by querying the mapping relationship list between the parameter information of the frequency search speed regulation gear and the frequency search restrictive condition.

Step 302: Determine the obtained frequency search restrictive condition as the frequency search restrictive condition that needs to be disabled.

In some embodiments, the frequency search restrictive condition includes at least one of a restrictive condition of waiting for power stabilization, a restrictive condition of waiting for ambient temperature stabilization, a restrictive condition of waiting for power output stabilization, and a restrictive condition of a computing efficiency guarantee policy. In some other embodiments, each frequency search restrictive condition may further include other specific restrictive conditions that may be involved in actual operation in such as the data processing device.

Wherein, the restrictive condition of waiting for power stabilization, the restrictive condition of waiting for ambient temperature stabilization, and the restrictive condition of waiting for power output stabilization refer to a power fluctuation condition, a temperature fluctuation condition, and a power supply fluctuation condition that need to be ensured during the frequency search process. For example, during the frequency search process, when a certain frequency is reached, the output power may be unstable, and it is necessary to wait for a period of time to ensure that the output power under this frequency is stable in a suitable fluctuation range. In a case that the restrictive condition of waiting for power stabilization is not disabled, it is necessary to take a certain amount of time to wait for power output stabilization during the frequency search process, so that the frequency search speed is reduced; and in a case that the restrictive condition of waiting for power stabilization is disabled, it is unnecessary to wait for power output stabilization during the frequency search process, so that the frequency search speed is increased.

Wherein, the computing efficiency guarantee policy refers to a method policy that needs to ensure computing efficiency during the frequency search process. The computing efficiency guarantee policy is a more complex process for control. In some cases, in order to complete frequency search as soon as possible without ensuring computing efficiency, the computing efficiency guarantee policy can be disabled, so that the data processing device is able to apply as many resources as possible to the frequency search process, so that the frequency search can be completed quickly.

Step 202: Disable the frequency search restrictive condition in a process of performing frequency search based on the obtained frequency search parameter.

Wherein, It should be noted that based on the model, the operating parameter, the gear allocation and adjustment requirements, and the like of each component module in the data processing device, which frequency search restrictive conditions at which gear are to be disabled may be specifically set, that is, the mapping relationship between the parameter information of each frequency search speed regulation gear and each frequency search restrictive condition may be set based on the model, the operating parameter, the gear allocation and adjustment requirements of each component module in the data processing device. For example, certain frequency search restrictive condition(s) is/are disabled under certain gear(s), and another certain frequency search restrictive condition(s) is/are disabled under another certain gear(s). In another example, the frequency search restrictive condition is not disabled under the lowest gear, a small number of frequency search restrictive conditions are disabled under the lower gear, more frequency search restrictive conditions are disabled under the higher gear, and all frequency search restrictive conditions are disabled under the highest gear.

Step 103: Perform frequency search based on the obtained frequency search parameter.

Wherein, performing the frequency search process may be implemented by relevant technologies, and the parameter used in the frequency search process and the frequency search restrictive condition that needs to be disabled are obtained based on the foregoing steps.

By obtaining parameter information of different frequency search speed regulation gears, adjusting frequency search parameter of the frequency search process, and performing the frequency search process by using different frequency search parameters, the method for controlling the frequency search speed of the embodiments of this disclosure thereby realizes the control of the frequency search speed, and indirectly control the computing efficiency during the frequency search process through the control of the frequency search speed, thereby satisfying the requirements for computing efficiency of different data processing tasks during the frequency search process. Further, based on the obtained parameter information of the different frequency search speed regulation gears, the corresponding frequency search restrictive condition is disabled during the frequency search process, so that the frequency search speed may be further increased or reduced, and the personalized requirements for computing efficiency of different data processing tasks during the frequency search process may be met to the largest degree.

Figure 4:
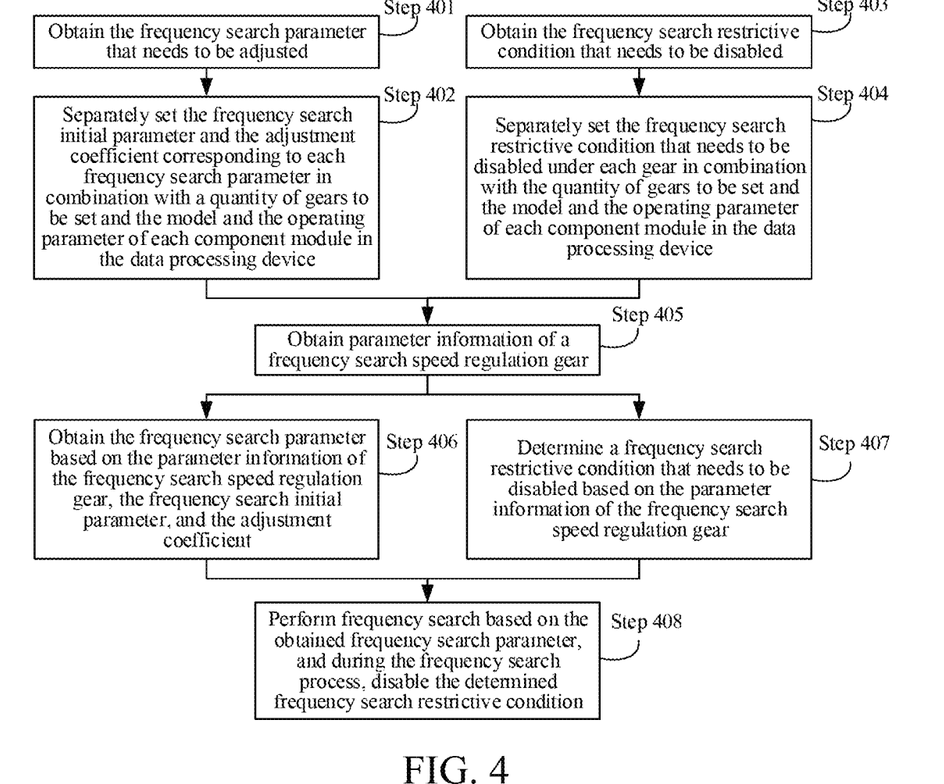
FIG. 4 is a flowchart of an application scenario of a method for controlling the frequency search speed according to an embodiment of this application.

FIG. 4 is a flowchart of an application scenario of a method for controlling the frequency search speed according to a specific embodiment. As shown in FIG. 4, the application scenario of the method for controlling the frequency search speed mainly includes the following steps 401 to 408.

Step 401: Obtain the frequency search parameter that needs to be adjusted.

Wherein, the frequency search parameter that needs to be adjusted includes at least one of the target accuracy parameter, the frequency search rise speed parameter, the frequency search range parameter, and the times of frequency search retry, wherein the target accuracy parameter includes at least one of the target power consumption ratio range parameter, the target computing efficiency range parameter, the target power range parameter, and the target temperature range parameter. In other embodiments, each frequency search parameter (not limited to the target accuracy parameter) may also include other specific parameters that may be involved in actual operation in such as the data processing device, which is not repeated herein.

In some embodiments, these parameters may be selectively selected or all selected.

Step 402: The frequency search initial parameter and the adjustment coefficient corresponding to each frequency search parameter are set separately in combination with a quantity of gears to be set and the model and the operating parameter of each component module in the data processing device.

Step 403: Obtain the frequency search restrictive condition that needs to be disabled.

Step 404: The frequency search restrictive condition that needs to be disabled under each gear is set separately in combination with the quantity of gears to be set and the model and the operating parameter of each component module in the data processing device.

Wherein, the frequency search restrictive condition includes at least one of the restrictive condition of waiting for power stabilization, the restrictive condition of waiting for ambient temperature stabilization, the restrictive condition of waiting for power output stabilization, and the restrictive condition of the computing efficiency guarantee policy. In other embodiments, each the frequency search restrictive condition may further include other specific restrictive conditions that may be involved in actual operation in such as the data processing device, which is not repeated herein.

Wherein, the frequency search restrictive condition that needs to be disabled under each gear may be set by using the form of the mapping relationship list.

Wherein, branches of steps 401 to 402 and branches of steps 403 to 404 may be executed simultaneously or sequentially.

Step 405: Obtain the parameter information of the frequency search speed regulation gear.

Wherein, the parameter information of the frequency search speed regulation gear may be the gear used by frequency search. Generally, the frequency search process is executed within a period of time after the data processing device is turned on, and based on this, the parameter information of the frequency search speed regulation gear may be obtained when the data processing device is turned on. In addition, the parameter information of the frequency search speed regulation gear may be set in a control software or hardware of the data processing device, and may be selected within a set range. For example, corresponding to the settings of ten gears, the parameter information of the frequency search speed regulation gears may include a total of 10 values: 0, 1, 2, 3, 4, 5, 6, 7, 8, and 9, and the parameter information of the frequency search speed regulation gears may be selected among these 10 values.

It should be noted that the foregoing is only an exemplary description. Corresponding to the settings of the ten gears, the parameter information of the frequency search speed regulation gears may also be set to other values based on the design requirements. For example, the parameter information of the frequency search speed regulation gear of gear 0 is 0, the parameter information of the frequency search speed regulation gear of gear 1 is 0.1, the parameter information of the frequency search speed regulation gear of gear 2 is 1, the parameter information of the frequency search speed regulation gear of gear 3 is 2, and the parameter information of the frequency search speed regulation gear of gear 4 is 5, and the like. In actual operation, it is necessary to set the parameter information of the frequency search speed regulation gears for different frequency search parameters under each gear based on the design requirements and the specific frequency search parameter that needs to be adjusted at the gear.

Step 406: Obtain the frequency search parameter based on the parameter information of the frequency search speed regulation gear, the frequency search initial parameter, and the adjustment coefficient.

Wherein, the frequency search parameter may be obtained by the following formula:

$$B = B0 + A \cdot C$$

Alternatively, the frequency search parameter may be obtained by the following formula:

$$B = B0 - A \cdot C$$

Wherein, A is the parameter information of the frequency search speed regulation gear, C is the adjustment coefficient, B0 is the frequency search initial parameter, and B is the frequency search parameter.

The foregoing formulas are general formulas covering the adjustment of various frequency search parameters. For example, when the formulas are applied to the frequency search rise speed parameter, A is the parameter information of the frequency search speed regulation gear, C is the adjustment coefficient of the frequency search rise speed, B0 is the frequency search rise speed initial parameter, and B is the frequency search rise speed parameter.

Step 407: Determine a frequency search restrictive condition that needs to be disabled based on the parameter information of the frequency search speed regulation gear.

Wherein, based on the mapping relationship list set in step 404, the frequency search restrictive condition that needs to be disabled and that is associated with the parameter information of the frequency search speed regulation gear may be obtained.

Wherein, Steps 406 and 407 may be executed simultaneously or sequentially.

Step 408: Perform frequency search based on the obtained frequency search parameter, and during the frequency search process, disable the determined frequency search restrictive condition.

Figure 5:
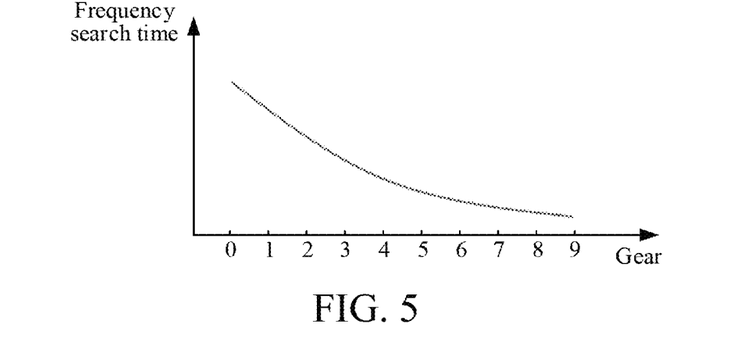
FIG. 5 is a schematic diagram of a relationship between a frequency search speed gear and a frequency search time according to an embodiment of this application.

FIG. 5 is a schematic diagram of a relationship between the frequency search speed regulation gear and a frequency search time according to an embodiment of this application. As shown in FIG. 5, using the method for controlling the frequency search speed according to this embodiment of this disclosure can enable the frequency search speed to accelerate with the increase in the gear (the increase in the parameter information of the frequency search speed regulation gear), and then the frequency search time to be shortened with the increase in the gear (the increase in the parameter information of the frequency search speed regulation gear).

Contrary to the trend shown in FIG. 5, in some other embodiments, the objective of reducing the frequency search speed with the increase of the gear may also be realized by setting the parameter information A of the frequency search speed regulation gear under different gears. It can be seen that the method for controlling the frequency search speed in this embodiment of this disclosure may select different frequency search speeds and then select different frequency search times based on the requirements for the data processing task.

Figure 6:
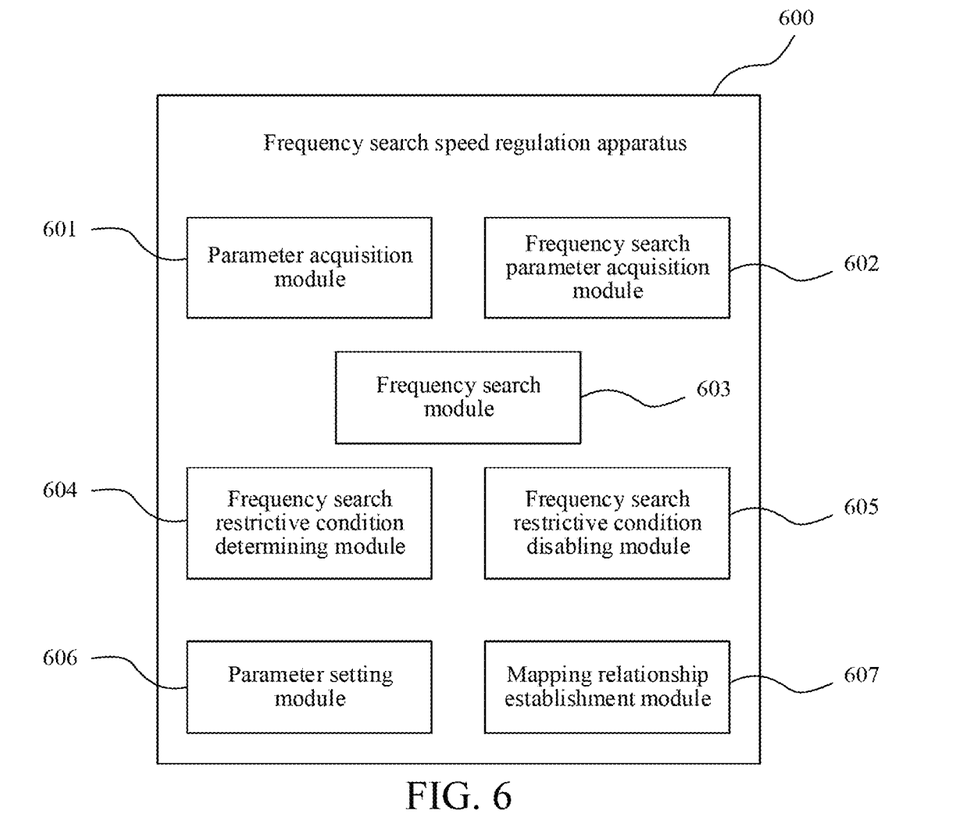
FIG. 6 is a schematic diagram of a logical structure of an apparatus for controlling the frequency search speed according to an embodiment of this application.

FIG. 6 is a schematic structural diagram of an apparatus for controlling the frequency search speed according to a specific embodiment. As shown in FIG. 6, the apparatus 600 for controlling the frequency search speed mainly includes a parameter acquisition module 601, a frequency search parameter acquisition module 602, and a frequency search module 603.

The parameter acquisition module 601 is configured to perform obtaining parameter information of the frequency search speed regulation gear.

The frequency search parameter acquisition module 602 is configured to perform obtaining the frequency search parameter based on the parameter information of the frequency search speed regulation gear.

The frequency search module 603 is configured to perform frequency search based on the obtained frequency search parameter.

In some embodiments, as shown in FIG. 6, the frequency search speed regulation apparatus 600 further includes a frequency search restrictive condition determining module 604 and a frequency search restrictive condition disabling module 605.

The frequency search restrictive condition determining module 604 is configured to perform determining a frequency search restrictive condition that needs to be disabled based on the parameter information of the frequency search speed regulation gear.

The frequency search restrictive condition disabling module 605 is configured to, in a process of performing frequency search based on the obtained frequency search parameter, perform disabling the frequency search restrictive condition.

In some embodiments, as shown in FIG. 6, the frequency search speed regulation apparatus 600 may further include a parameter setting module 606. The parameter setting module 606 is configured to perform setting the frequency search initial parameter and the adjustment coefficient. Wherein, the frequency search parameter acquisition module 602 is configured to perform obtaining the frequency search parameter based on the parameter information of the frequency search speed regulation gear, the frequency search initial parameter, and the adjustment coefficient. Further, the frequency search parameter acquisition module 602 is configured to perform multiplying the parameter information of the frequency search speed regulation gear with the adjustment coefficient, and adding the result obtained through multiplying to the frequency search initial parameter, to obtain the frequency search parameter.

In some embodiments, the frequency search parameter includes at least one of the target accuracy parameter, the frequency search rise speed parameter, the frequency search range parameter, and the times of frequency search retry.

In some embodiments, the target accuracy parameter includes at least one of the target power consumption ratio range parameter, the target computing efficiency range parameter, the target power range parameter, and the target temperature range parameter.

In some embodiments, as shown in FIG. 6, the frequency search speed regulation apparatus 600 may further include a mapping relationship establishment module 607. The mapping relationship establishment module 607 is configured to perform establishing the mapping relationship between the parameter information of the frequency search speed regulation gear and the frequency search restrictive condition. Wherein, the frequency search restrictive condition determining module 604 is further configured to perform: obtaining the frequency search restrictive condition corresponding to the parameter information of the frequency search speed regulation gear from the mapping relationship; and determining the obtained frequency search restrictive condition as the frequency search restrictive condition that needs to be disabled.

In some embodiments, the frequency search restrictive condition includes at least one of the restrictive condition of waiting for power stabilization, the restrictive condition of waiting for ambient temperature stabilization, the restrictive condition of waiting for power output stabilization, and the restrictive condition of the computing efficiency guarantee policy.

By obtaining parameter information of different frequency search speed regulation gears, adjusting the frequency search parameter of the frequency search process, and performing the frequency search process by using different frequency search parameters, the frequency search speed regulation apparatus of the embodiments of this disclosure thereby realize the control of the frequency search speed, and indirectly control the computing efficiency during the frequency search process through the control of the frequency search speed, thereby satisfying the different requirements for computing efficiency during the frequency search process. Further, based on the obtained parameter information of the different frequency search speed regulation gears, the corresponding frequency search restrictive condition may be disabled during the frequency search process, so that the frequency search speed may be further increased or reduced, and the personalized requirements for computing efficiency of different data processing tasks during the frequency search process may be met to the largest degree.

Specific operation execution manners of each unit in the frequency search speed regulation apparatus in the foregoing embodiment have been described in detail in the embodiment about the method for controlling the frequency search speed, and details will not be described herein again.

It should be noted that: the foregoing embodiments are merely illustrated with an example of division of each functional module. In practical applications, the function distribution may be implemented by different functional modules based on requirements, that is, an internal structure of the device is divided into different functional modules, to implement all or some of the functions described above.

An embodiment of this disclosure further provides a data processing device. The data processing device employs the apparatus for controlling the frequency search speed according to any of the foregoing embodiments, wherein the data processing device may be a computer device.

Figure 7:
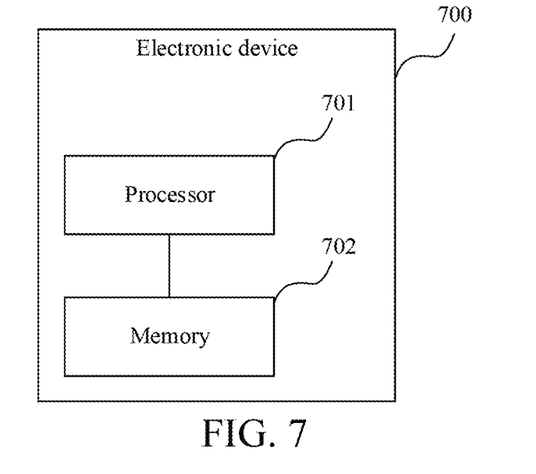
FIG. 7 is a schematic structural diagram of an electronic device provided by an embodiment of this application.

FIG. 7 is a schematic structural diagram of an electronic device according to an embodiment of this disclosure. In some embodiments, the electronic device is a server. The electronic device 700 may vary a lot due to different configurations or performance, and may include one or more processors (central processing units (CPUs)) 701 and one or more memories 702. Wherein, the memory 702 stores at least one program code which can be loaded and executed by the processor 701 to implement the method for controlling the frequency search speed according to the various foregoing embodiments. Certainly, the electronic device 700 may further have components such as a wired or wireless network interface, a keyboard, and an input/output (I/O) interface, etc. to facilitate input and output. The electronic device 700 may further include other components used to implement a function of the device. Details are not further described herein.

In an exemplary embodiment, there is further provided a computer-readable storage medium including at least one instruction, for example, a memory including at least one instruction. The above-described at least one instruction may be executed by the processor in a computer device to complete the method for controlling the frequency search speed according to the foregoing embodiments.

In some embodiments, the above-described computer-readable storage medium may be a non-temporary computer-readable storage medium, and for example, the non-temporary computer-readable storage medium may include ROM(s)(Read-Only Memory, ROM), RAM(s) (Random-Access Memory, RAM), CD-ROM(s) (Compact Disc Read-Only Memory, CD-ROM), magnetic tape(s), floppy disk(s), optical data storage device(s), or the like.

In some embodiments, an embodiment of this application further provides a computer program product, including a computer program, when the computer program is executed by a processor, the method for controlling the frequency search speed provided in this embodiment of this application is implemented.

The foregoing descriptions are merely better embodiments of this disclosure, but are not intended to limit this disclosure. Any modification, equivalent replacement, or improvement made without departing from the spirit and principle of this disclosure should fall within the protection scope of this disclosure.

What is claimed is:

1. A method for controlling a frequency search speed, performed by a data processing device, comprising:
   obtaining, in response to the data processing device being turned on, parameter information of a frequency search speed regulation gear;
   setting a frequency search initial parameter and an adjustment coefficient;
   multiplying the parameter information of the frequency search speed regulation gear with the adjustment coefficient, and adding a result obtained through multiplying to the frequency search initial parameter, to obtain a frequency search parameter;
   performing, within a period of time after the data processing device is turned on, frequency search based on the obtained frequency search parameter to determine an ideal operating frequency of each chip in the data processing device; and
   operating each chip in the data processing device at the respective ideal operating frequency determined by the frequency search.

2. The method for controlling the frequency search speed according to claim 1, wherein the frequency search parameter comprises at least one of a target accuracy parameter, a frequency search rise speed parameter, a frequency search range parameter, and times of frequency search retry.

3. The method for controlling the frequency search speed according to claim 2, wherein
   the target accuracy parameter comprises at least one of a target power consumption ratio range parameter, a target computing efficiency range parameter, a target power range parameter, and a target temperature range parameter.

4. The method for controlling the frequency search speed according to claim 1, wherein the method further comprises:
   determining a frequency search restrictive condition that needs to be disabled based on the parameter information of the frequency search speed regulation gear; and
   in a process of performing frequency search based on the obtained frequency search parameter, disabling the determined frequency search restrictive condition.

5. The method for controlling the frequency search speed according to claim 4, wherein the method further comprises:
   establishing a mapping relationship between the parameter information of the frequency search speed regulation gear and the frequency search restrictive condition;
   wherein the determining the frequency search restrictive condition that needs to be disabled based on the parameter information of the frequency search speed regulation gear comprises:
   obtaining the frequency search restrictive condition corresponding to the parameter information of the frequency search speed regulation gear based on the mapping relationship; and
   determining the obtained frequency search restrictive condition as the frequency search restrictive condition that needs to be disabled.

6. The method for controlling the frequency search speed according to claim 4, wherein the frequency search restrictive condition comprises at least one of a restrictive condition of waiting for power stabilization, a restrictive condition of waiting for ambient temperature stabilization, a restrictive condition of waiting for power output stabilization, and a restrictive condition of a computing efficiency guarantee policy.

7. An electronic device, comprising:
   a processor; and
   a memory, configured to store executable instructions of the processor, wherein
   the processor is configured to execute the executable instructions, to implement the method for controlling the frequency search speed according to claim 1.

8. A non-transitory computer-readable storage medium, wherein when at least one instruction in the computer-readable storage medium is executed by a processor of an electronic device, the electronic device is enabled to implement the method for controlling the frequency search speed according to claim 1.

9. A computer program product, comprising a computer program, wherein when the computer program is executed by a processor, the method for controlling the frequency search speed according to claim 1 is implemented.

* * * * *